Charles F. Ruset, Impt in the Manufacture of Brushes. B.

№ 105373

PATENTED JUL 12 1870

Witnesses:
Fred Hayner
R. T. Kimball

Inventor:
Chs. F. Ruset

United States Patent Office.

CHARLES F. RUSET, OF BROOKLYN, NEW YORK.

Letters Patent No. 105,373, dated July 12, 1870.

IMPROVEMENT IN THE MANUFACTURE OF BRUSHES.

The Schedule referred to in these Letters Patent and making part of the same.

*To all whom it may concern:*

Be it known that I, CHARLES F. RUSET, of Brooklyn, in the county of Kings and State of New York, have invented a new and useful Improvement in the Manufacture of Brushes, of which the following is a full, clear, and exact description, reference being had to the accompanying drawing forming part of this specification, and in which—

Figure 1:
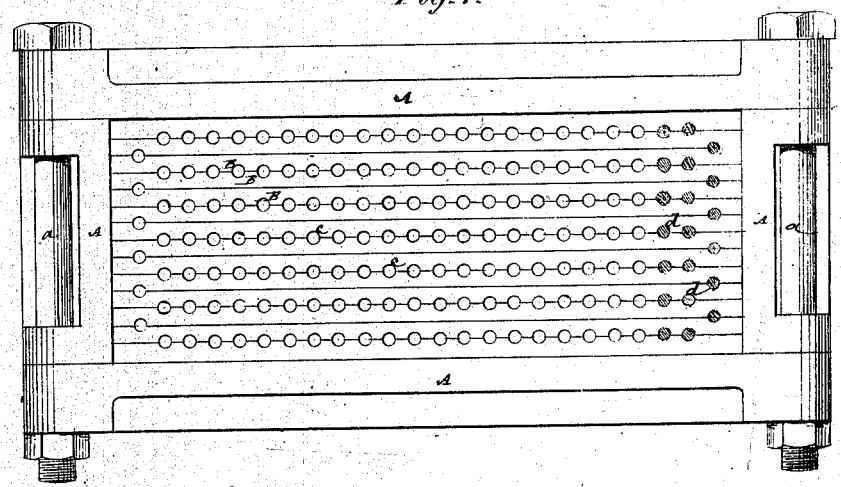
Figure 2:
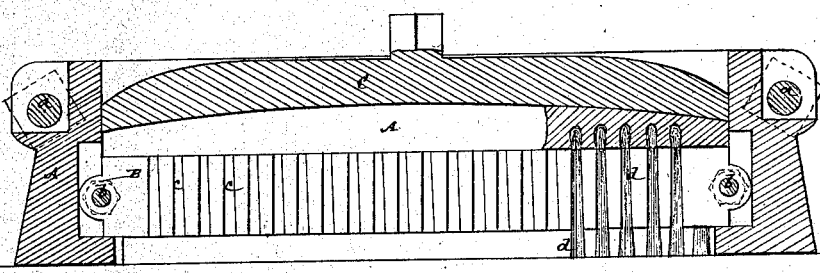

Figure 1 represents a plan of a mold or box, composed of or containing a perforated block made up of strips, for making brushes, in accordance with my improvement, and Figure 2, a longitudinal sectional elevation of the same, with a follower therein, and as in the process of making a brush.

Similar letters of reference indicate corresponding parts.

My invention relates to brushes, in which the bristles are divided into separate tufts within a stock or back, that may also form the handle, and more particularly relates to such brushes, irrespective of any particular form or purpose as regards the brush, in which the tufts are imbedded, through the agency of a perforated block or mold and a follower, within a back composed of prepared India rubber, gutta-percha, or any suitable material or composition capable of assuming a plastic state, and of afterward setting or being hardened.

The invention consists in a divided strip-like construction of the perforated block or bottom of the mold, through which the looped tufts are drawn to secure the imbedding of them in the plastic back, the dividing lines of the strips being arranged to run centrally through the perforations in parallel courses, whereby increased facility is afforded for removal of the brush from the mold when made, without endangering the loosening or extraction of the tufts in or from the back.

Referring to the accompanying drawing—

A A represent sides and ends of a frame, mold, or box, held together by bolts *a a*, so as to admit of the same being readily taken apart, and serving to carry within them a perforated block, made up of parallel strips B B, secured at their ends by bolts *b b*, to form a bottom to the mold. The perforations *c c*, through this sectionally-constructed block or mold bottom, are arranged so that they are diametrically divided by the strips, that is, each perforation is formed half its diameter in the one strip and half in the adjacent strip.

In making the brush, the tufts *d d* are looped in the usual manner and passed through the perforations *c c* from below, till their looped ends or portions project somewhat above the tops of the strips B B. To facilitate the passage of the tufts, and to give them a better hold in the brush-back, as well as to secure to them a free and spreading action or arrangement on the face of the back, the perforations *c c* are of a diminishing taper in an upward direction.

The tufts *d d* having been arranged in the mold or box, as shown and described, prepared India rubber, gutta-percha, or other suitable material or composition, is introduced while in a plastic state, in a suitable quantity, within the mold above the strips B B, so that, on a follower, C, being brought down by a press action within the mold, said material or composition is compressed into a solid mass of a configuration corresponding with the interior of the mold and under side of the follower, and which may either be plain or ornamental. This not only forms the brush-back, but causes the looped ends of the tufts to be imbedded therein, and, after the material composing the back has been hardened or allowed to set, establishes a secure hold of the tufts. The mold or box is then opened, and the strips B B opened or separated, when the brush may be removed and the tufts *d d* drawn out from between the strips or perforations *c c*, without endangering the loosening or extraction of them in or from the back, by reason of the dividing lines of the strips being made to diametrically intersect said perforations.

What is here claimed, and desired to be secured by Letters Patent, is—

The sectionally-constructed block or mold bottom, having perforations *c c* through it, and made up of strips B B, arranged to intersect said perforations diametrically, in combination with the surrounding body of the mold, constructed to receive a follower, C, within it, substantially as specified.

CH. F. RUSET.

Witnesses:
    FRED. HAYNES,
    R. E. RABEAU.